US012712794B2

(12) United States Patent
Tyagi et al.

(10) Patent No.: US 12,712,794 B2
(45) Date of Patent: Aug. 18, 2026

(54) NETWORK SCANNER DETECTION

(71) Applicant: Illumio, Inc., Sunnyvale, CA (US)

(72) Inventors: Pallavi Tyagi, Sunnyvale, CA (US); Paul James Kirner, Palo Alto, CA (US)

(73) Assignee: Illumio, Inc., Sunnyvale, CA (US)

( * ) Notice: Subject to any disclaimer, the term of this patent is extended or adjusted under 35 U.S.C. 154(b) by 150 days.

(21) Appl. No.: 17/988,123

(22) Filed: Nov. 16, 2022

(65) Prior Publication Data

US 2024/0163191 A1 May 16, 2024

(51) Int. Cl.
*G06F 15/173* (2006.01)
*H04L 43/028* (2022.01)
*H04L 43/062* (2022.01)

(52) U.S. Cl.
CPC .......... *H04L 43/062* (2013.01); *H04L 43/028* (2013.01)

(58) Field of Classification Search
CPC ........................... H04L 43/062; H04L 43/028
See application file for complete search history.

(56) References Cited

U.S. PATENT DOCUMENTS 8,516,586 B1 * 8/2013 Jensen ................ H04L 63/1425 713/153
10,164,846 B2 * 12/2018 Mihelich ............... H04L 43/028
2003/0212779 A1 * 11/2003 Boyter ................ H04L 63/1433 709/223
2006/0031472 A1 * 2/2006 Rajavelu ............... H04L 43/065 709/224
2016/0127390 A1 * 5/2016 Lai ...................... H04L 63/1416 726/23
2021/0314269 A1 * 10/2021 Stewart ............... H04L 63/1425
2022/0239675 A1 * 7/2022 Panse .................. H04L 63/1416

OTHER PUBLICATIONS

Microsoft, “Stealth Mode in Windows Firewall with Advanced Security,” Jul. 2, 2012, one page, [Online] [Retrieved on May 2, 2023] Retrieved from the Internet URL:<https://learn.microsoft.com/en-us/previous-versions/windows/it-pro/windows-server-2008-R2-and-2008/dd448557(v=ws.10)?redirectedfrom=MSDN>.
Borges, E., “Top 20 and 200 most scanned ports in the cybersecurity industry,” SecurityTrails, May 7, 2019, 14 pages, [Online] [Retrieved on May 2, 2023] Retrieved from the Internet URL:<https://securitytrails.com/blog/top-scanned-ports>.

* cited by examiner

*Primary Examiner* — Duyen M Doan
(74) *Attorney, Agent, or Firm* — Fenwick & West LLP

(57) ABSTRACT

A computer-implemented method, system, and non-transitory computer-readable medium provide for detection and accounting for scanners in a network. A statistical approach is used to identify scanners in a network. The network traffic generated by identified scanners can be filtered out to give a cleaner, more detailed perspective of traffic flows between applications in the network.

20 Claims, 5 Drawing Sheets

NETWORK SCANNER DETECTION

BACKGROUND

1. Technical Field

The subject matter described relates generally to network analytics and, in particular, to detecting and accounting for network traffic due to scanners.

2. Background Information

There are numerous reasons why network administrators and other users wish to monitor network traffic within a computer network. Having an accurate picture of connections occurring within the network can be used to detect security breaches or vulnerabilities, identify equipment failures, and predict where additional infrastructure will be required, etc. It is a regular practice to run scanners that connect to many hosts and/or ports for doing basic health checkups of the network. However, this also generates an enormous amount of noise in network analytics data that can hinder the analysis and evaluation of other network traffic.

SUMMARY

A statistical approach is used to identify scanners in a network. In contrast to traditional techniques, which typically identify scanners using a simple threshold on the number of ports per source and can have high rates of false positive and false negatives, the disclosed approach can more accurate scanner detection. The network traffic generated by identified scanners can be filtered out to give a cleaner, more detailed perspective of traffic flows between applications in the network. This may also enable users to write policy rules for scanners and other applications to provide further clarity.

In one embodiment, network flow data that indicates connection between workloads in the network is received (e.g., by a management server in the network) and preprocessed. The preprocessing may involve extracting flows of interest (e.g., those using the TCP protocol that are either terminated or closed), bucketing the extracted flows (e.g., by hour), and dividing the extracted flows into subsets based on whether the sources and destinations are managed or unmanaged workloads and/or the operating system types of the source and destination workloads. Network flow metrics are calculated from the preprocessed network flow data and a statistical model is applied to the network flow metrics to identify scanners. The network flow data may be filtered to remove flows originating from sources identified as scanners to reduce the noise generated by the identified scanners. A report may be generated for display from the network flow data with the noise removed to provide a clearer picture of network flows not due to scanners within the network.

DETAILED DESCRIPTION

The figures (FIGS.) and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone refers to any one or any combination of such elements unless the context indicates otherwise.

Overview

Figure 1:
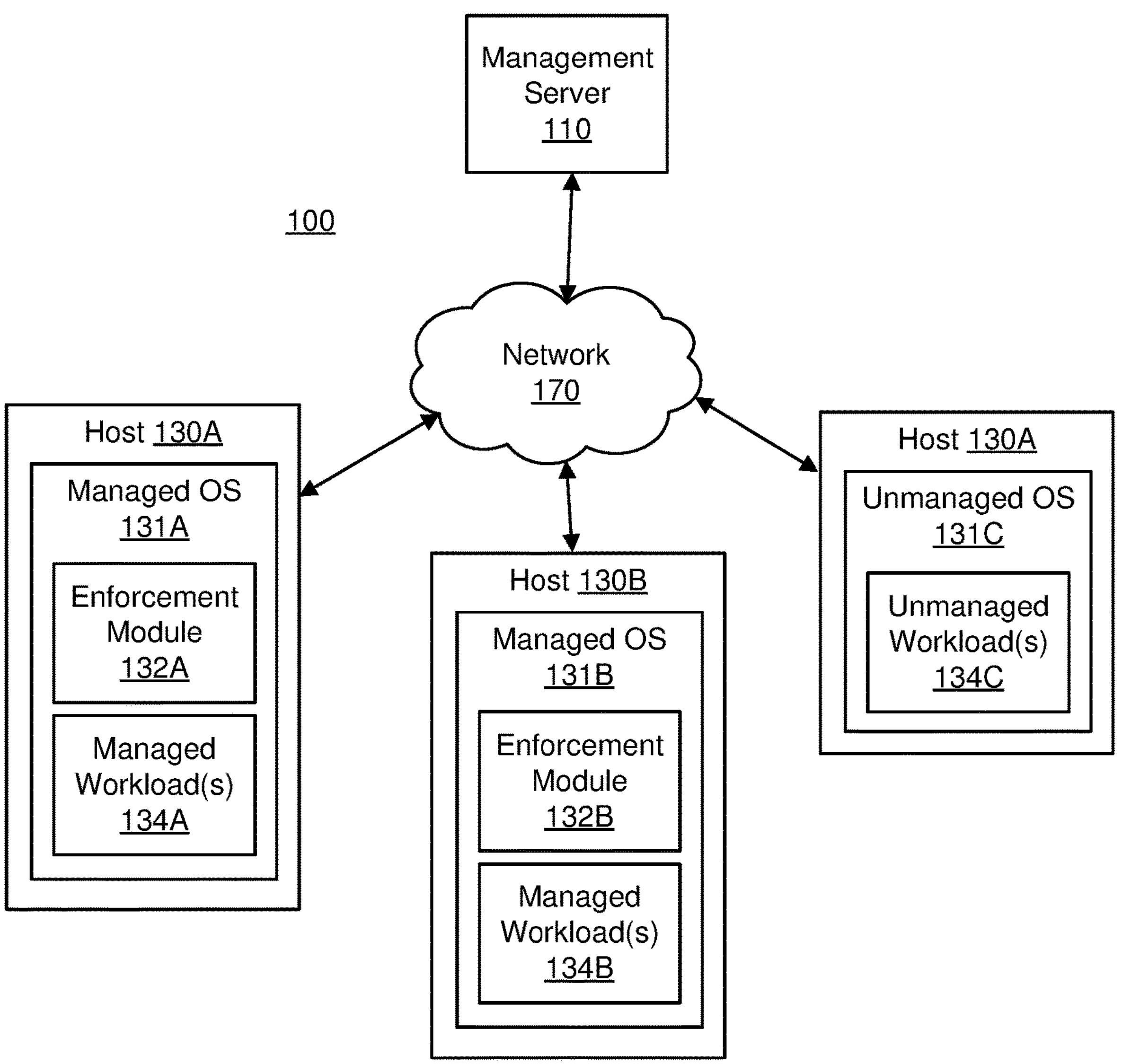
FIG. 1 is a block diagram of a networked computing environment in which scanner detection may be used, according to one embodiment.

FIG. 1 illustrates one embodiment of a networked computing environment 100 in which scanner detection may be implemented. In the embodiment shown, the networked computing environment 100 includes a management server 110 and a set of hosts 130, all connected via a network 170. In other embodiments, the networked computing environment 100 includes different or additional elements. In addition, the functions may be distributed among the elements in a different manner than described.

A host 130 may be a physical computer system or a virtual machine executing on computer system. Although FIG. 1 shows three hosts 130A, 130B, 130C, the networked computing environment 100 can include any number of hosts (typically many more than three). A host 130 includes one or more operating system (OS) instances 131. Different hosts 130 may use different operating systems 131. For example, host 130A may use a windows operating system 131A, host 130B may use a Linux operating system 131B, while host 130C may use a Unix operating system 130C. Similarly, although each host 130 is shown as using a single operating system 131, some hosts may have multiple OS instances 131. For example, a single computing system may host a first virtual machine running Windows and a second virtual machine running Linux.

An OS instance 131 may be managed or unmanaged. A managed OS instance (e.g., OS instance 131A or 131B) includes an enforcement module (e.g., enforcement module 132A or 132B) that enables the managed OS instance to enforce a segmentation policy for one or more managed workloads (e.g., workload(s) 134A and 134B) that it executes. In contrast, an unmanaged OS instance (e.g., OS instance 131C) does not include an enforcement module 132 and is unable to directly contribute to enforcement of the segmentation policy for the workload(s) 134C that it executes. However, the segmentation policy may be enforced for unmanaged OS instances by controlling what incoming and outgoing connections the enforcement modules 132 of managed OS instances will allow with the unmanaged OS instances.

The management server 110 is one or more computer systems that mange the segmentation policy for the hosts 130. The segmentation policy regulates communications between workloads 134 within the networked computing environment 100. In one embodiment, the segmentation policy is set forth using permissive rules that specify the communications that are permitted. The segmentation policy is enforced by the enforcement modules 132 blocking any communications that are not expressly permitted by the rules. The segmentation policy may include a set of rules specifying whether certain workloads 134 are allowed to provide services to or receive services from other workloads and may place restrictions on how those workloads are allowed to communicate when providing or consuming the services. For example, the segmentation policy may include a rule specifying that a first workload 134A operating on a first OS instance 131A is allowed to provide a particular service to a second workload 134C operating on a second OS instance 131C. Absent other rules, the first workload 134A will thus be blocked from providing the service to a third workload 134B operating on a third OS instance 131B. The rule may furthermore specify the type of service that the first workload 134A is allowed to provide to the second workload 134C (e.g., a database service, a web service, etc.). Additionally, the rule may specify how the workloads 134 may communicate when providing this service (e.g., using encrypted communication only, using authenticated communication only, etc.). A rule may be specified as a set of fields including a "service," a "provided-by" portion that identifies one or more workloads 134 that is permitted to provide the service (which may be specified by a port number), a "used-by" portion that identifies one or more workloads that is permitted to use the service provided by the workloads in the "provided-by portion," and a "rule function" that may place one or more restrictions on the communications between the workloads while facilitating the service.

The management server 110 also monitors network flow data (e.g., received from enforcement modules 132) that indicates traffic flowing between workloads 134. The network flow data may identify incoming and outgoing connections for the workloads 134 of each managed OS instance 131. The management server 110 analyzes the network flow data to identify traffic that is likely to be the result of scanners.

Figure 2:
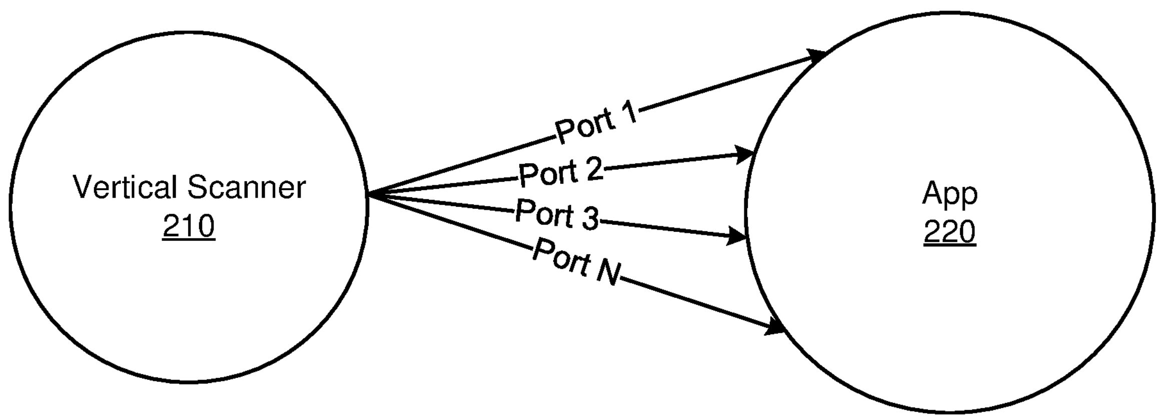
FIG. 2 illustrates the operation of a vertical scanner.
Figure 3:
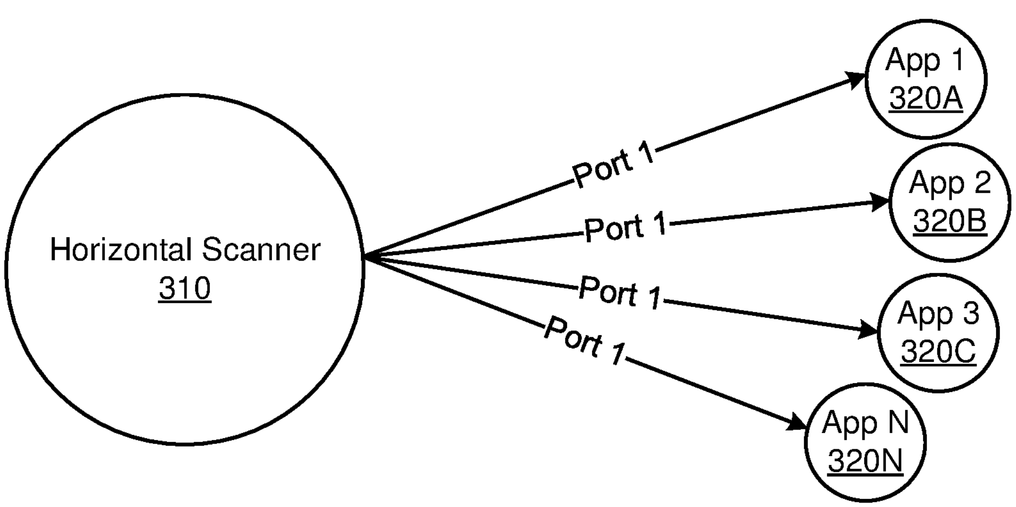
FIG. 3 illustrates the operation of a horizontal scanner.

FIG. 2 illustrates one type of scanner, referred to as a vertical scanner 210 (or port scanner). The vertical scanner 210 attempts to connect to a specific application 220 on a large number of ports. FIG. 3 illustrates another type of scanner, referred to as a horizontal scanner 310 (or IP scanner). The horizontal scanner 310 attempts to connect to a large number of applications 320A through 320N on a single port. Other types of scanners may exhibit a combination of horizontal and vertical scanning behavior (e.g., attempting to connect to a smaller number of applications than a typical horizontal scanner 310 on a range of ports smaller than a typical vertical scanner 210). Such scanners may be referred to as hybrid scanners.

Referring back to FIG. 1, the management server 110 filters out the network traffic that is attributed to likely scanners. The management server 110 may use the filtered network flow data to generate reports and other information for display to users in a user interface. Thus, the presented information may provide the user with a view of how the network is being used without the noise generated by the scanners obscuring how workloads 134 are interacting in the networked computing environment 100. The user interface may be provided on a display of the management server 110 or at another computing device. For example, the management server 110 may provide one or more visualizations of the filtered network traffic via a portal or webpage that users may access via the network 170.

The network 170 provides the communication channels via which the other elements of the networked computing environment 100 communicate. The network 170 can include any combination of local area and wide area networks, using wired or wireless communication systems. In one embodiment, the network 170 uses standard communications technologies and protocols. For example, the network 170 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, some or all of the communication links of the network 170 may be encrypted using any suitable technique or techniques.

Example Management Server

Figure 4:
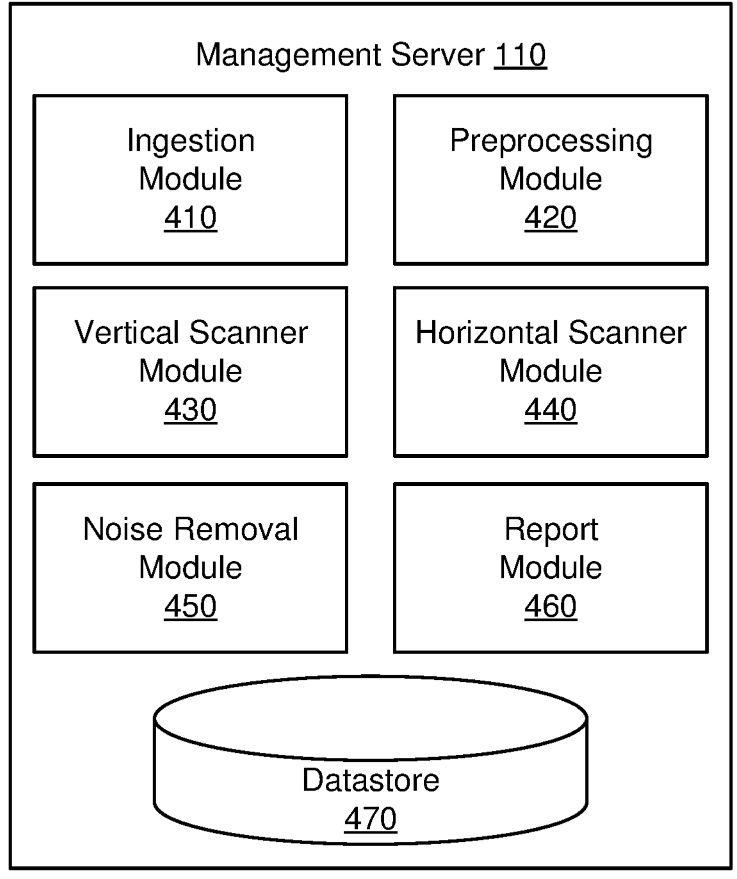
FIG. 4 is a block diagram of the management server of FIG. 1, according to one embodiment.

FIG. 4 illustrates one embodiment of management server 110. In the embodiment shown, the management server 110 includes an ingestion module 410, a preprocessing module 420, a vertical scanner module 430, a horizontal module 440, a noise removal module 450, a report module 460, and a datastore 470. In other embodiments, the management server 110 includes different or additional elements. For example, the management server 110 may include one or more modules for managing the segmentation policy used in the networked computing environment 100. In addition, the functions may be distributed among the elements in a different manner than described.

The ingestion module 410 receives network flow data from enforcement modules 132. The network flow data includes information about the flows between different workloads 134 observed by the enforcement modules 132. The flow data includes both successful and unsuccessful attempts by workloads 134 to connect to other workloads 134. In one embodiment, the ingestion modules 410 stores a data object (e.g., in datastore 470) for each flow. The data object for a flow may include a source (e.g., a workload ID or IP address), a destination (e.g., a workload ID or IP address), a destination port (e.g., in the range from 0 to 65536), a protocol identifier (e.g., a numerical identifier of whether the flow is ICMP, TCP, or UDP), a source process name, a destination process name, a state of the flow (e.g., closed, terminated, or active), a source OS type (e.g., Linux or Windows), a destination OS type (e.g., Linux or Windows), a flow direction (inbound or outbound), and/or a timestamp indicating when the enforcement module 132 reported the flow. In other embodiments, the network flow data may include different or additional information about observed flows.

The preprocessing module 420 preprocesses the ingested flow data to extract flows of interest for further analysis. Generally, the disclosed techniques use the availability or unavailability of process name in the flow data to distinguish between successful and unsuccessful connections. In one embodiment, the preprocessing module 420 extracts TCP flows that have been closed or terminated. The extracted flow data is divided into buckets based on timestamps. For example, the flow data may be divided into hourly buckets.

Alternatively, buckets of other time periods may be used, such as ten minutes, thirty minutes, two hours, or three hours, etc. For convenience, the following description describes embodiments where hourly buckets are used, but it should be understood that the same techniques may be applied with buckets of different lengths.

The vertical scanner module 430 analyzes the preprocessed flow data to identify vertical scanners in then networked computing environment 100. In various embodiments, the vertical scanner module 430 divides the flow data into subsets based on whether the source and destination are managed or unmanaged workloads. In particular, the data may be divided into subsets where the source and destination workloads are both managed, just the source workload is managed, and just the destination workload is managed. There will be no workloads where both the source and destination workloads are unmanaged because in such a scenario there is no enforcement module that will see and report the flow. The subsets may be further subdivided based on the OS type of the source and/or destination workloads.

For subsets where both the source and the destination are managed workloads 134, the flow data generally includes incoming and outgoing versions of each flow (except where the destination use a Windows operating system with the stealth firewall feature enabled). Thus, the flow data in such subsets is deduplicated (e.g., by removing the outgoing version of each duplicated flow). In the case where the destination workload 134 has a stealth firewall enabled, unsuccessful connections are dropped by the stealth firewall and are thus not seen by the enforcement module 132 (and are not reported the management server 110). This scenario can be detected by identifying flows that are reported by the source but not the destination (despite the destination being a managed workload 134) and the outgoing version of the flow retained for further analysis.

The vertical scanner module 430 calculates metrics from the filtered flow data. There are two broad types of analysis that the vertical scanner module 430 may perform (depending on the specific embodiment), analysis on flow data in which the destination process name available (which can then be used as a proxy for whether a connection was successful) and flow data in which the destination process name is not available.

For subsets where the destination process name is available, the vertical scanner module 430 arranges the hourly buckets of the filtered flow data in a table that uses a duple formed from the source identifier (e.g., the source IP) and the destination identifier (e.g., the destination IP) as the key. The values in the table are the counts of non-service ports (ports where no service is running) for each bucket. The vertical scanner module 430 can also calculate values for the maximum hourly port count of each row for some or all of the buckets. For rows containing only counts of non-service ports the vertical scanner module 430 may calculate a maximum non-service port count and a median non-service port count.

Additionally or alternatively, in some embodiments, the vertical scanner module 430 may calculate metrics for a list of well-known ports that are used for inexpensive scanning. For example, these metrics may be based on connections involving ports: 21 (FTP), 22 (SSH), 23 (Telnet), 25 (SMTP), 53 (DNS), 80 (HTTP), 110 (POP3), 111 (RPC-BIND), 135 (MSRPC), 139 (NETBIOS-SSN), 143 (IMAP), 443 (HTTPS), 445 (MICROSOFT-DS), 993 (IMAPS), 995 (POP3S), 1723 (PPTP), 3306 (MYSQL), 3389 (MS-WBT-SERVER), 5900 (VNC), and/or 8080 (HTTP-PROXY). The vertical scanner module 430 may create a common ports subset of the main data set (e.g., to be stored in the datastore 470) that includes only those flows involving a port on the list and calculate the maximum port count for each row in the subset.

The main data set and/or the well-known port subset may be filtered to remove rows for which the median non-service port count is not zero. Typically, scanners will run periodically or intermittently and, when active, will scan the network for a relatively short amount of time. Thus, over the time period reflected by a row of data, the scanner will mostly be inactive so the majority of buckets will have a non-service port count of zero. Therefore, if a row does not have a median non-service port count of zero, it is unlikely to be a scanner and the row can be discarded.

Scanners will typically request connections on a large number of ports where the service is not listening on the destination port. Thus, rows with a low non-service port count are unlikely to scanners and can be discarded. On one embodiment, the main data set is filtered to remove rows with a non-service port count less than a first threshold (e.g., ten) and/or the well-known port subset is filtered to remove rows with a non-service port count less than a second threshold (e.g., five).

Regardless of the precise filtering performed, the remaining filtered rows are candidates for being scanning jobs performed by vertical scanners. Non-service port counts are defined as errors because they represent connections that were attempted to ports that no service was listening on. The vertical scanner module 430 may calculate the percentages of errors for rows as the ratio of the maximum non-service port count to the maximum hourly port count.

The vertical scanner module 430 regroups the data for sources across all destinations and calculates error metrics that indicate whether the source is a vertical scanner. In one embodiment, the error metrics include the maximum percentage of errors for the source across all of the destinations that the source potentially scanned, the maximum hourly count of well-known ports connected to by the source across all destinations, and the percentage of destinations the source connected to for which the connections are considered to be candidates for scanning behavior. Generally, scanners will have a high percentage of errors (because most of the connections they attempt will fail), will connect to at least some of the well-known scanning ports, and will perform scans on most of the destinations it attempts to connect to (as opposed to, for example, backup events that might occur intermittently like scanning jobs but only for one or two destinations). The vertical scanner module 430 determines whether sources are vertical scanners based on the error metrics. For example, a source may be considered to be a scanner if the maximum percentage of errors exceeds a first threshold (e.g., is greater than or equal to 0.5), the maximum hourly count of well-known ports exceeds a second threshold (e.g., in greater than zero), and the percentage of destinations connected to considered to be scans exceeds a third threshold (e.g., greater than or equal to 0.5).

For subsets where the destination process name is not available, the vertical scanner module 430 calculates different metrics for identifying potential vertical scanning jobs. In one embodiment, the vertical scanner module 430 arranges the flow for these subsets in a table that uses the source identifier (e.g., the source IP) and the destination identifier (e.g., the destination IP) as the key and has the count of unique ports the source connected to on the destination in each hour as the values. The vertical scanner module 430 calculates the maximum port count and the median hourly port count for each row. If two workloads communicate regularly, they are unlikely to be scanners. Therefore, any rows with a median hourly port count that is not zero may be discarded. The vertical scanner module 430 may also calculate the percentage of destinations scanned by a source as the ratio of destinations connected to by the source that appear to be scans to the total number of destinations connected to by the source. The vertical scanner module 430 may determine whether the source is a scanner based on the calculated metrics. For example, if the maximum hourly port count for a source is greater than a first threshold (e.g., ten) and the percentage of destinations scanned by the source is greater than a second threshold (e.g., 50%) then the source may be identified as a vertical scanner.

The vertical scanner module 430 may generate an aggregated list of vertical scanners by taking union of the results generated for the subsets where the destination process name is and is not available. If there is an overlap between the results from the subsets, the results generated from the flow data where the process name was available may be used as this approach is generally more accurate.

The horizontal scanner module 440 analyzes the preprocessed flow data to identify horizontal scanners in then networked computing environment 100. In various embodiments, the horizontal scanner module 440 creates subsets of the network flow data based on direction and OS type of the workloads 134. In one embodiment, there is a first subset of flows where the source is a managed workload 134 (of any OS type) and the destination is a managed workload with a Windows OS, and a second subset of flows where the source can be a managed or unmanaged workload, or even a non-workload, and the destination is a managed workload with a Linux OS.

The horizontal scanner module 440 defines an error as an attempt to connect on a port associated with one OS type on a workload 134 with a different OS type. For example, if a source connects on a Windows port on a Linux workload and the service on the windows port was not running then this connection is determined to be an erroneous connection. The horizontal scanner module 440 may calculate metrics to determine whether a given port is generally a Windows port or a Linux port.

In one embodiment, the horizontal scanner module 440 calculates an event percentage and a non-event percentage for a given port and OS type. The event percentage is the ratio of the count of workloads of the OS type that had a service listening on the port and the total number of workloads of the OS type, multiplied by one hundred, and the nonevent percentage is the ratio of the count of workloads not of the OS type that had a service listening on the port and the total number of workloads not of the OS type. The horizontal scanner module 440 can calculate a Weight of Evidence (WoE) score as:

$$WoE = \ln\left(\frac{\text{event }\%}{\text{nonevent }\%}\right)$$

and an Information Value (IV) score as:

$$IV = (\text{event }\% - \text{nonevent }\%) \times WoE$$

The horizontal scanner module 440 may classify ports as Windows ports or Linux ports based on the WoE and IV scores. In one embodiment, the horizontal scanner module 440 classifies a port as a Linux port if the WoE score exceeds a first threshold (e.g., zero) and the IV score exceeds a second threshold (e.g., 0.5). Similarly, the horizontal scanner module 440 may classify a port as a Windows port if the WoE score is less than a third threshold (e.g., zero) and the IV score exceeds a fourth threshold (e.g., 0.5). The first and third thresholds and/or the second and fourth thresholds may be the same. If the WoE and IV scores for a port do meet the requirements to classify the port as either a Linux port or a Windows port, the horizontal scanner module 440 does not associate the port with a specific OS type. This may mean that the port is used by multiple OS types roughly equally or it may mean that there is currently insufficient data to accurately classify the port.

Having assigned OS types to ports, the horizontal scanner module 440 can label connections as errors where the OS type of the port does not match the OS type of the destination and the relevant service was not running on the destination. In one embodiment, the horizontal scanner module 440 calculates an error percentage for a source as the total number of errors for the source (e.g., the number of Linux port connections to destinations running Windows plus the number of Windows port connections to destinations running Linux) divided by the total number of destinations the source connects to multiplied by one hundred. If the percentage error for a source exceeds a threshold (e.g., 50%), the horizontal scanner module 440 identifies the source as a horizontal scanner.

The noise removal module 450 filters flows that are due to scanners from the original, unfiltered network flow data. In one embodiment, the noise removal module 450 finds all flows that have a source identifier that matches the source identifier of a scanner identified by the vertical scanning module 430 or the horizontal scanning module 440. These flows are then removed. Thus, the noise removal module 450 can generate a version of the network flow data that provides a view of all flows in the network except those caused by scanners. In environments where the scanners flows represent a significant proportion of the total amount of traffic, this can enable users to see behaviors of interest that would otherwise be masked by the noise generated by scanners.

The report module 460 generates one or more reports using the noise-removed network flow data generated by the noise removal module 450. The reports can include ranked lists of the most active flows (e.g., pairs of workflows with the greatest number of connections or most amount of data exchanged in a time period) and/or visualizations of traffic in the networked computing environment 100. One of skill in the art will appreciate that a wide range of techniques for presenting network flow data are possible, each providing distinct insights into the behavior of workloads 134 in the networked computing environment 100.

The datastore 470 includes one or more non-transitory computer-readable media that store the data used by the other elements of the management server 110. For example, the datastore 470 may store the segmentation policy used in the networked computing environment 100. The datastore 470 may also store copies of the filtered and unfiltered flow data as well as any calculated metrics or reports that are generated by the management server 110.

Example Methods

Figure 5:
FIG. 5 is a flowchart of a method for detecting and accounting for scanner traffic in the networked computing environment, according to one embodiment.
Figure 5:
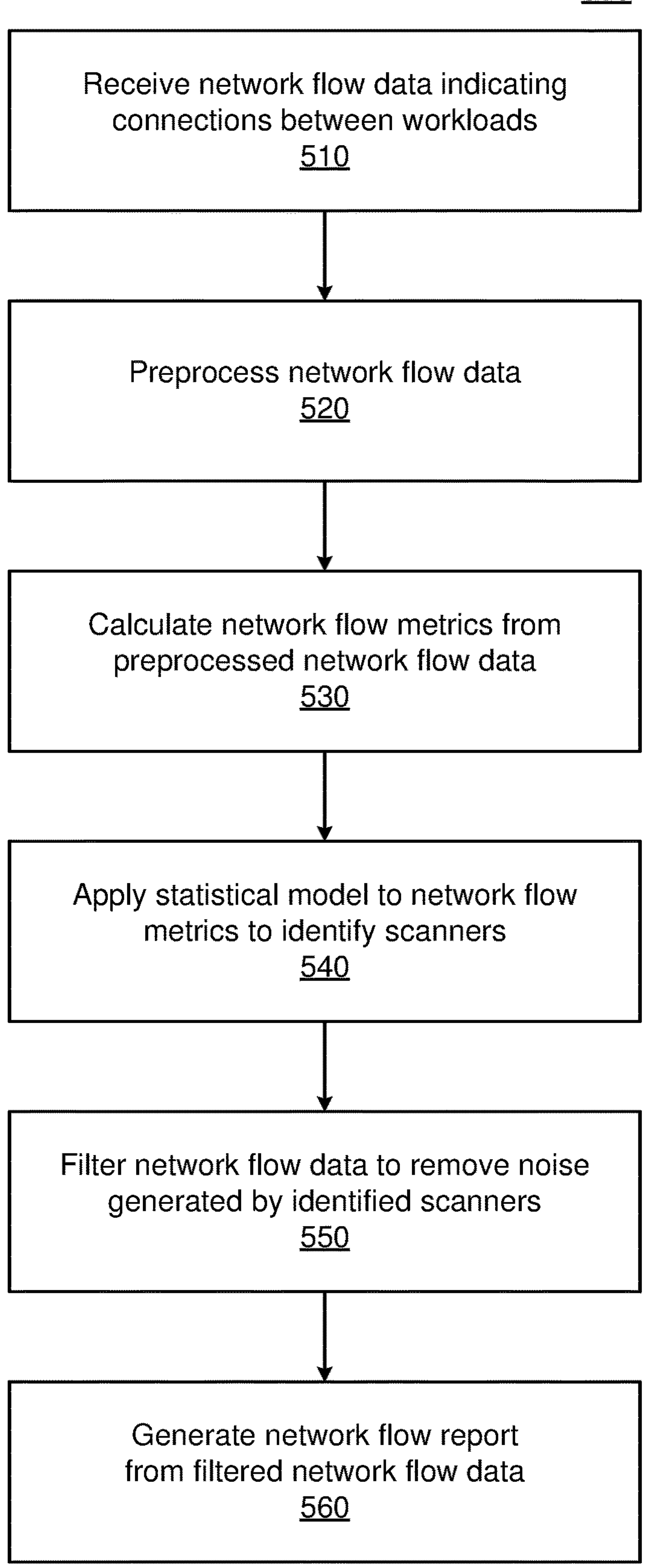

FIG. 5 illustrates a method 500 for detecting and accounting for scanner traffic in the networked computing environment 100, according to one embodiment. The steps of FIG. 5 are illustrated from the perspective of the management server 110 performing the method 500. However, some or all of the steps may be performed by other entities or components. In addition, some embodiments may perform the steps in parallel, perform the steps in different orders, or perform different steps.

In the embodiment shown, the method 500 begins with management server 110 receiving 510 network flow data indicating connections between workflows 134. As described previously, the network flow data may be collected by enforcement module 132 and provided to the management server 110 via the network 170. The management server 110 preprocesses 520 the network flow data. In one embodiment, the preprocessing 520 includes extracting flows that use the TCP protocol and that have either the closed or terminated status. The preprocessing 520 may also include divided into hourly buckets based on timestamps of the flows indicating when the flows were reported by the enforcement modules 132.

The management server 110 calculates 530 one or more network flow metrics from the preprocessed network flow data and applies 540 one or more models to the network flow metrics to identify scanners. As described previously, different approaches may be applied to identify horizontal and vertical scanners as well as to identify scanners from flows with different source and destination parameters (e.g., different OS types and whether the source and destination are managed workflows 134). The results of applying different models/approaches may be aggregated into a complete list of identified scanners. The network flow data may then be filtered 550 to remove the noise generated by identified scanners (e.g., all flows originating from identified scanners) and the management server 110 may generate 560 one or more reports from the filtered flow data. The reports can include metrics and/or visualizations of the non-scanner traffic in the network.

Computing System Architecture

Figure 6:
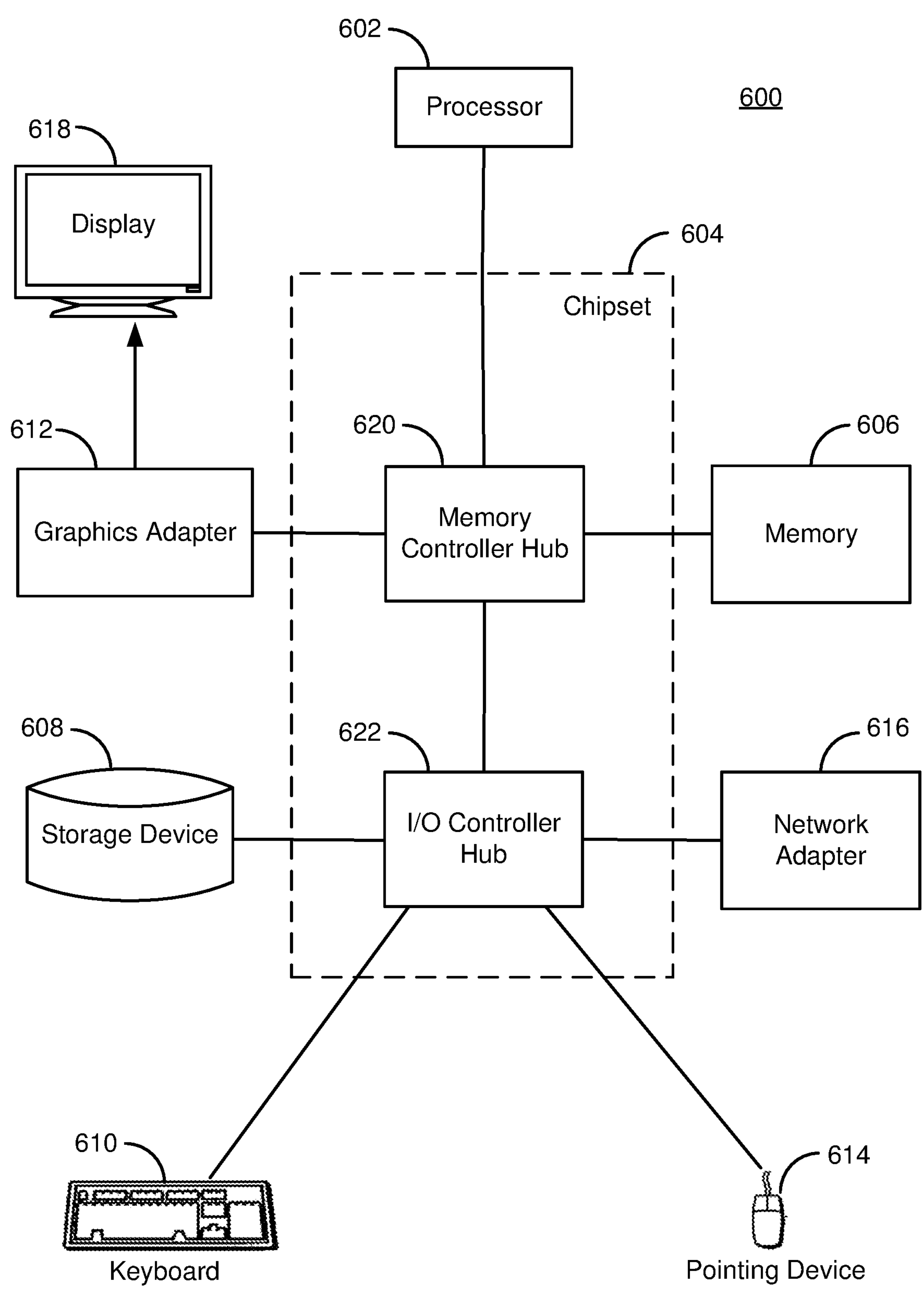
FIG. 6 is a block diagram illustrating an example of a computer suitable for use in the networked computing environment of FIG. 1, according to one embodiment.

FIG. 6 is a block diagram of an example computer 600 suitable for use as a management server 110 or host 130. The example computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

In the embodiment shown in FIG. 6, the storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, touchscreen, or other type of pointing device, and may be used in combination with the keyboard 610 (which may be an on-screen keyboard) to input data into the computer system 600. The graphics adapter 612 displays images and other information on the display 618. The network adapter 616 couples the computer system 600 to one or more computer networks, such as network 170.

The types of computers used by the entities of FIGS. 1 AND 4 can vary depending upon the embodiment and the processing power required by the entity. For example, THE management server 110 might include multiple blade servers working together to provide the functionality described. Furthermore, the computers can lack some of the components described above, such as keyboards 610, graphics adapters 612, and displays 618.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for detecting and accounting for scanner traffic in a network. Thus, while particular embodiments and applications have been illustrated and described, it is to be understood that the described subject matter is not limited to the precise construction and components disclosed. The scope of protection should be limited only by the following claims.

What is claimed is:

1. A computer-implemented method of detecting and accounting for scanners in a network, the method comprising:

receiving network flow data that indicates connection between workloads in the network;

preprocessing the network flow data to generate preprocessed network flow data;

calculating network flow metrics from the preprocessed network flow data, wherein calculating the network flow metrics comprises determining an operating system (OS) type of a port by:

calculating a weight of evidence (WoE) score;

calculating an information value (IV) score; and selecting an OS corresponding to the port based on a comparison of the WoE score and IV score to respective thresholds, wherein the metrics include a percentage of error that measures, for each of a subset of sources, a proportion of destination workloads not of the OS type for which a connection was made to a port associated with the OS type relative to all destination workloads in the network;

applying a statistical model to the network flow metrics to identify scanners, wherein applying the statistical model comprises discarding as not scanners sources for which percentage of error is less than a threshold;

filtering the network flow data to remove noise generated by the identified scanners, the noise being flows in the preprocessed network flow data that have a source identifier that matches one of the scanners identified by the statistical model, wherein the noise comprises flows originating from the identified scanners; and generating for display a report from the network flow data with the noise removed.

2. The computer-implemented method of claim 1, wherein preprocessing the network flow data comprises extracting flows that have a status of terminated or closed.

3. The computer-implemented method of claim 1, wherein preprocessing the network flow data comprises extracting flows that use a TCP protocol.

4. The computer-implemented method of claim 1, wherein preprocessing the network flow data comprises dividing the network flow data into buckets, each bucket corresponding to a time period.

5. The computer-implemented method of claim 1, wherein the metrics further include a median non-service port count for each of a second subset of sources, and applying the statistical model further comprises discarding as not scanners sources for which the median non-service port count is not zero.

6. The computer-implemented method of claim 1, wherein the metrics further include a maximum non-service port count for each of a second subset of sources, and applying the statistical model further comprises discarding as not scanners sources for which the maximum non-service port count is less than a threshold.

7. The computer-implemented method of claim 1, wherein the metrics further include a count of well-known ports connected to for a second subset of sources, and applying the statistical model further comprises discarding as not scanners sources for which the count of well-known ports connected to is less than a threshold.

8. The computer-implemented method of claim 1, wherein the metrics further include, for each of a second subset of sources, a percentage of errors calculated from a ratio of a maximum non-service port count for the source and a maximum port count for the source, and applying the statistical model further comprises discarding as not scanners sources for which the percentage of errors is less than a threshold.

9. The computer-implemented method of claim 1, wherein the metrics further include, for each of a second subset of sources, a percentage of destinations scanned that indicates a proportion of all destinations connected to by the source for which the source exhibited scanning behavior, and applying the statistical model further comprises discarding as not scanners sources for which the percentage of destinations scanned is less than a threshold.

10. The computer-implemented method of claim 1, wherein the metrics further include, for each of a second subset of sources, a maximum port count, and applying the statistical model further comprises discarding as not scanners sources for which the maximum port count is less than a threshold.

11. The computer-implemented method of claim 1, wherein the WoE score is given by $$WoE = \ln\left(\frac{\text{event }\%}{\text{nonevent }\%}\right)$$

and the IV score is given by IV=(event %−nonevent %)×WoE, where event % is a measure of a proportion of all workloads of the OS type in the network that had a service listening on the port, and nonevent % is a measure of a proportion of all workloads not of the OS type in the network that had a service listening on the port.

12. The computer-implemented method of claim 1, wherein the scanners identified comprise at least one of a vertical scanner, a horizontal scanner, or a hybrid scanner.

13. The computer-implemented method of claim 1, wherein, for a subset of flows, availability of a process name from a destination is used as a proxy for there being a successful connection.

14. A non-transitory computer-readable storage medium comprising instructions for detecting and accounting for scanners in a network, the instructions, when executed by a computing system, causing the computing system to:

receive network flow data that indicates connection between workloads in the network;

preprocess the network flow data to generate preprocessed network flow data;

calculate network flow metrics from the preprocessed network flow data, wherein the instructions that cause the computing system to calculate the network flow metrics comprise instructions that cause the computing system to determine an operating system (OS) type of a port by:

calculating a weight of evidence (WoE) score;

calculating an information value (IV) score; and selecting an OS corresponding to the port based on a comparison of the WoE score and IV score to respective thresholds, wherein the metrics include a percentage of error that measures, for each of a subset of sources, a proportion of destination workloads not of the OS type for which a connection was made to a port associated with the OS type relative to all destination workloads in the network;

apply a statistical model to the network flow metrics to identify scanners, wherein the instructions that cause the computing system to apply the statistical model comprise instructions that cause the computing system to discard as not scanners sources for which percentage of error is less than a threshold;

filter the network flow data to remove noise generated by the identified scanners, the noise being flows in the preprocessed network flow data that have a source identifier that matches one of the scanners identified by the statistical model, wherein the noise comprises flows originating from the identified scanners successful connections between the scanners identified by the statistical model; and generate for display a report from the network flow data with the noise removed.

15. The non-transitory computer-readable storage medium of claim 14, wherein the instructions that cause the computing system to preprocess the network flow data comprise instructions that cause the computing system to divide the network flow data into buckets, each bucket corresponding to a time period.

16. A computing system for detecting and accounting for scanners in a network, the computing system comprising:

a processor; and a non-transitory computer-readable storage medium comprising instructions that, when executed by the processor, cause the computing system to:

receive network flow data that indicates connection between workloads in the network;

preprocess the network flow data to generate preprocessed network flow data;

calculate network flow metrics from the preprocessed network flow data, wherein the instructions that cause the computing system to calculate the network flow metrics comprise instructions that cause the computing system to determine an operating system (OS) type of a port by:

calculating a weight of evidence (WoE) score;

calculating an information value (IV) score; and selecting an OS corresponding to the port based on a comparison of the WoE score and IV score to respective thresholds, wherein the metrics include a percentage of error that measures, for each of a subset of sources, a proportion of destination workloads not of the OS type for which a connection was made to a port associated with the OS type relative to all destination workloads in the network;

apply a statistical model to the network flow metrics to identify scanners, wherein the instructions that cause the computing system to apply the statistical model comprise instructions that cause the computing system to discard as not scanners sources for which percentage of error is less than a threshold;

filter the network flow data to remove noise generated by the identified scanners, the noise being flows in the preprocessed network flow data that have a source identifier that matches one of the scanners identified by the statistical model, wherein the noise comprises flows originating from the identified scanners; and generate for display a report from the network flow data with the noise removed.

17. The non-transitory computer-readable storage medium of claim 14, wherein the metrics further include a median non-service port count for each of a second subset of sources, and the instructions that cause the computing system to apply the statistical model further comprise instructions that cause the computing system to discard as not scanners sources for which the median non-service port count is not zero.

18. The non-transitory computer-readable storage medium of claim 14, wherein the metrics further include a maximum non-service port count for each of a second subset of sources, and the instructions that cause the computing system to apply the statistical model further comprise instructions that cause the computing system to discard as not scanners sources for which the maximum non-service port count is less than a threshold.

19. The non-transitory computer-readable storage medium of claim 14, wherein the metrics further include a count of well-known ports connected to for a second subset of sources, and the instructions that cause the computing system to apply the statistical model further comprise instructions that cause the computing system to discard as not scanners sources for which the count of well-known ports connected to is less than a threshold.

20. The non-transitory computer-readable storage medium of claim 14, wherein the metrics further include, for each of a second subset of sources, a percentage of errors calculated from a ratio of a maximum non-service port count for the source and a maximum port count for the source, and the instructions that cause the computing system to apply the statistical model further comprise instructions that cause the computing system to discard as not scanners sources for which the percentage of errors is less than a threshold.

* * * * *